United States Patent
Duron et al.

(10) Patent No.: US 7,669,084 B2
(45) Date of Patent: **\*Feb. 23, 2010**

(54) METHOD FOR SELF-DIAGNOSING REMOTE I/O ENCLOSURES WITH ENHANCED FRU CALLOUTS

(75) Inventors: Mike C. Duron, Pflugerville, TX (US); Mark D. McLaughlin, Austin, TX (US)

(73) Assignee: International Business Machines Corporation, Armonk, NY (US)

( \* ) Notice: Subject to any disclaimer, the term of this patent is extended or adjusted under 35 U.S.C. 154(b) by 0 days.

This patent is subject to a terminal disclaimer.

(21) Appl. No.: 12/247,831

(22) Filed: Oct. 8, 2008

(65) Prior Publication Data

US 2009/0031165 A1 Jan. 29, 2009

Related U.S. Application Data

(63) Continuation of application No. 10/932,706, filed on Sep. 2, 2004, now Pat. No. 7,454,657.

(51) Int. Cl.
*G06F 11/00* (2006.01)
(52) U.S. Cl. .............................. 714/30; 714/43; 714/44
(58) Field of Classification Search .................. 714/14, 714/30, 43, 44
See application file for complete search history.

(56) References Cited

U.S. PATENT DOCUMENTS

| | | | |
|---|---|---|---|
| 4,347,563 A | 8/1982 | Paredes et al. |
| 5,909,595 A | 6/1999 | Rosenthal et al. |
| 6,044,411 A | 3/2000 | Berglund et al. |
| 6,282,674 B1 | 8/2001 | Patel et al. |
| 6,351,819 B1 | 2/2002 | Berglund et al. |
| 6,574,752 B1 | 6/2003 | Ahrens et al. |
| 6,823,375 B2 | 11/2004 | Lee et al. |
| 6,832,342 B2 | 12/2004 | Fields, Jr. et al. |
| 6,901,344 B2 | 5/2005 | Mantey et al. |
| 6,938,181 B1 | 8/2005 | Talagala et al. |
| 6,944,854 B2 | 9/2005 | Kehne et al. |
| 6,961,785 B1 | 11/2005 | Arndt et al. |
| 7,136,778 B2 | 11/2006 | Duron et al. |
| 7,219,258 B2 | 5/2007 | LeVangia et al. |
| 7,290,180 B2 | 10/2007 | Duron et al. |

(Continued)

OTHER PUBLICATIONS

Singh et al., "A Power, Packing, and Cooling Overview of the IBM eServer z900.", IBM Journal of Research and Development, vol. 46, No. 6, Nov. 2002.

*Primary Examiner*—Philip Guyton
(74) *Attorney, Agent, or Firm*—Yee & Associates, P.C.; Diana R. Gerhardt

(57) ABSTRACT

A method, apparatus, and computer instructions for self-diagnosing remote I/O enclosures with enhanced FRU callouts. when a failure is detected on a RIO drawer, a data processing system uses the bulk power controller to provide an alternate path, rather than using the existing RIO links, to access registers on the I/O drawers. The system logs onto the bulk power controller, which provides a communications path between the data processing system and the RIO drawer. The communications path allows the data processing system to read all of the registers on the I/O drawer. The register information in the I/O drawer is then analyzed to diagnose the I/O failure. Based on the register information, the data processing system identifies a field replacement unit to repair the I/O failure.

24 Claims, 2 Drawing Sheets

U.S. PATENT DOCUMENTS

| | | |
|---|---|---|
| 2002/0087749 A1 | 7/2002 | Tomioka |
| 2002/0124062 A1 | 9/2002 | Lee et al. |
| 2004/0210793 A1 | 10/2004 | Chokshi et al. |
| 2004/0215929 A1 | 10/2004 | Floyd et al. |
| 2004/0260981 A1 | 12/2004 | Kitamorn et al. |
| 2005/0081126 A1 | 4/2005 | Kulkami et al. |
| 2005/0144533 A1 | 6/2005 | LeVangia et al. |
| 2005/0154929 A1 | 7/2005 | Ahrens, Jr. et al. |
| 2005/0160314 A1 | 7/2005 | Ahrens, Jr. et al. |
| 2005/0216796 A1 | 9/2005 | Carlos |

METHOD FOR SELF-DIAGNOSING REMOTE I/O ENCLOSURES WITH ENHANCED FRU CALLOUTS

This application is a continuation of application Ser. No. 10/932,706, filed Sep. 2, 2004 now U.S. Pat. No. 7,454,657 status allowed.

CROSS REFERENCE TO RELATED APPLICATIONS

The present invention is related to the following applications entitled "Method for Non-Invasive Performance Monitoring and Tuning", Ser. No. 10/932,700, filed on Sep. 2, 2004; and "Method to Use an Alternate I/O Debug Path", Ser. No. 10/932,704, filed on Sep. 2, 2004. All of the above related applications are assigned to the same assignee, and incorporated herein by reference.

BACKGROUND OF THE INVENTION

1. Technical Field

The present invention relates generally to an improved data processing system, and in particular to a method, system, and computer product for handling errors in a data processing system. Still more particularly, the present invention provides a method, system, and computer product for self-diagnosing remote input/output (I/O) enclosures with enhanced field replacement unit (FRU) callouts.

2. Description of Related Art

A multiprocessor data processing system is a data processing system that contains multiple central processing units. This type of system allows for logical partitioning in which a single multiprocessor data processing system may run as if the system were two or more independent systems. In such a system, each logical partition represents a division of resources in the system and operates as an independent logical system. Each of these partitions is logical because the division of resources may be physical or virtual. For example, a multiprocessor data processing system may be partitioned into multiple independent servers, in which each partition has its own processors, main storage, and input/output devices.

Many systems include multiple remote input/output (RIO) subsystems in which each subsystem includes a bridge or some other interface to connect the subsystem with other portions of the data processing system through a primary or main input/output hub. Each of these remote I/o subsystems is also referred to as a "RIO drawer". Each of these RIO drawers may include peripheral components, such as, for example, hard disk drives, tape drives, or graphics adapters.

RIO drawers are typically physically separated from the processors and memory components of the computer. The RIO drawers and their components are connected to the main computer using RIO network cables which allow the I/o devices contained within the RIO drawers to function with the remainder of the computer as if they were on the system bus.

A service processor or partition may be used to detect any failures that occur in the remote drawers during a diagnostic test. When an error is detected, a service call is made which indicates each field replacement unit (FRU) that must be replaced in order to clear the error. For systems that offer JTAG access to the RIO drawers, the FRU callout may be performed using the JTAG links. However, some systems, such as the IBM eServer pSeries Regatta 690 and the IBM eServer pSeries and iSeries Squadrons systems, products of International Business Machines Corporation in Armonk, N.Y., do not have JTAG access to the RIO drawers. In these systems, RIO links are used to connect the central electronics complex (CEC) to a host of I/O devices. These links provide communication paths from the processors in the CEC to the I/O drawers. However, there are some chip registers on the I/O drawers, such as debug and performance registers, that are not accessible using the RIO links. Thus, if an I/O error occurs in the RIO drawers in a system that does not have JTAG access, the system may not be able to read all of the required registers to make a complete diagnosis of the problem. Consequently, a complete FRU callout to correct errors on the RIO drawer may not be possible. In addition, a diagnosis of the I/O failure also may not be obtainable if the system is in a checkstop state and the RIO link is broken.

Therefore, it would be advantageous to have an improved method, apparatus, and computer instructions for diagnosing failures on RIO enclosures with greater granularity to provide complete FRU callouts.

SUMMARY OF THE INVENTION

The present invention provides an improved method, apparatus, and computer instructions for self-diagnosing RIO enclosures with enhanced FRU callouts. When a failure is detected on a RIO drawer, a data processing system uses the bulk power controller to provide an alternate path, rather than using the existing RIO links, to access registers on the I/O drawers. The system logs onto the bulk power controller, which provides a communications path between the data processing system and the RIO drawer. The communications path allows the data processing system to read all of the registers on the I/O drawer. The register information in the I/O drawer is then analyzed to diagnose the I/O failure. Based on the register information, the data processing system identifies a field replacement unit to repair the I/O failure.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
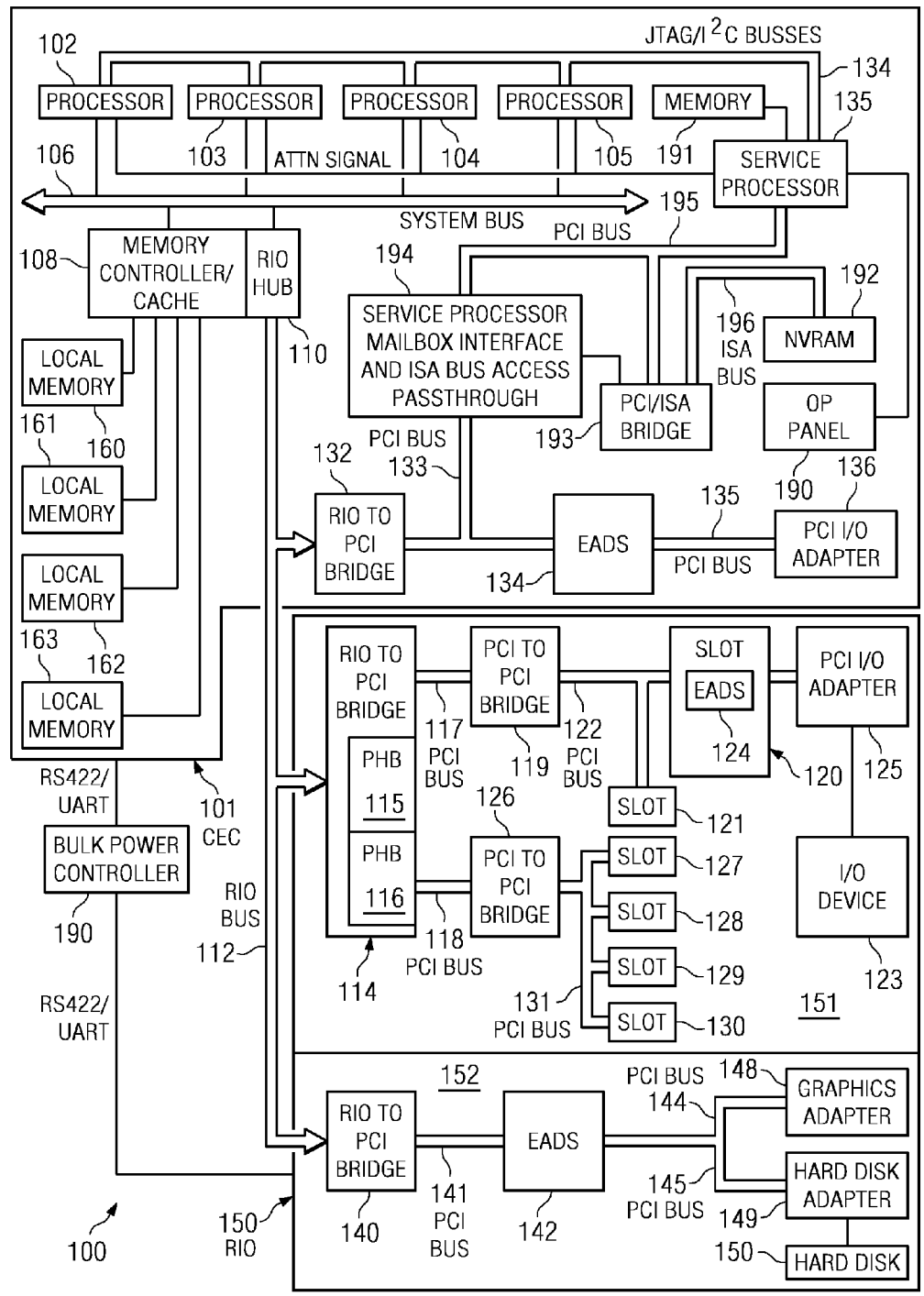
FIG. 1 is a block diagram of an exemplary data processing system in which the present invention may be implemented in accordance with the present invention.

With reference now to the figures, and in particular with reference to FIG. 1, a block diagram of a data processing system in which the present invention may be implemented is depicted. Data processing system 100 includes a central electronic complex 101 which includes logically partitioned hardware. CEC 101 includes a plurality of processors 102, 103, 104, and 105 connected to system bus 106. Alternatively, a single processor system may be employed. Also connected to system bus 106 is memory controller/cache 108, which provides an interface to a plurality of local memories 160-163. RIO Hub 110 is connected to system bus 106 and provides an interface to RIO bus 112. Memory controller/cache 108 and RIO Hub 110 may be integrated as depicted.

Data processing system 100 is a logically partitioned data processing system. Thus, data processing system 100 may have multiple heterogeneous operating systems (or multiple instances of a single operating system) running simultaneously. Each of these multiple operating systems may have any number of software programs executing within it. Data processing system 100 is logically partitioned such that different PCI slots, to which PCI I/O adapters may be coupled, such as slots 120, 121, and 127-130, graphics adapter 148, and hard disk adapter 149 may each be assigned to different logical partitions. In this case, graphics adapter 148 provides a connection for a display device (not shown), while hard disk adapter 149 provides a connection to control hard disk 150.

Each operating system executing within data processing system 100 is assigned to a different logical partition. Thus, each operating system executing within data processing system 100 may access only those I/O units that are within its logical partition. Thus, for example, one instance of the Advanced Interactive Executive (AIX) operating system may be executing within partition P1, a second instance, also called an image, of the AIX operating system may be executing within partition P2, and a Windows 2000 operating system may be operating within logical partition P3. Windows 2000 is a product and trademark of Microsoft Corporation of Redmond, Wash.

Data processing system 100 includes RIO enclosure 150, which includes a plurality of I/O drawers 151 and 152 connected to RIO bus 112. RIO to PCI bridge 114 in I/O drawer 151 is connected to RIO bus 112 and provides an interface to PCI bus 117 and PCI bus 118. RIO to PCI bridge 114 includes one or more PCI host bridges (PHB), such as PHB 115 and PHI 116. Each PHB is coupled to a PCI to PCI bridge through a PCI bus. For example, PHB 115 is coupled to PCI to PCI bridge 119 through PCI bus 117. PHB 116 is coupled to PCI to PCI bridge 126 through PCI bus 118. Each PCI to PCI bridge is coupled to one or more PCI slots. For example, PCI to PCI bridge 119 is coupled to slot 120 and slot 121 using PCI bus 122. Although only two slots are shown, typically either tour or eight slots are supported by each PHB. PCI to PCI bridge 126 is coupled to slots 127-130 using PCI bus 131.

Each slot includes an EADS chip to which a PCI I/O adapter may be attached. For example, slot 120 includes EADS 124. An I/O adapter may be inserted into a slot and thus coupled to an EADS. For example, I/O adapter 125 is inserted into slot 120 and coupled to EADS 124. An I/O device may be coupled to data processing system 100 utilizing an I/O adapter. For example, as depicted, I/O device 123 is coupled to I/O adapter 125.

A memory mapped graphics adapter 148 may be connected to RIO bus 112 through PCI bus 144, EADS 142, PCI bus 141, and RIO to PCI bridge 140. A hard disk 150 may be coupled to hard disk adapter 149 which is connected to PCI bus 145. In turn, this bus is connected to EADS 142, which is connected to RIO to PCI Bridge 140 by PCI bus 141.

A RIO to PCI bridge 132 provides an interface for a PCI bus 133 to connect to RIO bus 112. PCI I/O adapter 136 is connected to EADS 134 by PCI bus 135. EADS 132 is connected to PCI bus 133. This PCI bus also connects RIO to PCI bridge 132 to the service processor mailbox interface and ISA bus access pass-through logic 194 and PCI-to-PCI bridge 132. Service processor mailbox interface and ISA bus access pass-through logic 194 forwards PCI accesses destined to the PCI/ISA bridge 193. NVRAM storage 192 is connected to the ISA bus 196. Service processor 135 is coupled to service processor mailbox interface and ISA bus access pass-through logic 194 through its local PCI bus 195. Service processor 135 is also connected to processors 102-105 via a plurality of JTAG/I$^2$C busses 134. JTAG/I$^2$C busses 134 are a combination of JTAG/scan busses (see IEEE 1149.1) and Phillips I$^2$C busses. However, alternatively, JTAG/I$^2$C busses 134 may be replaced by only Phillips I$^2$C busses or only JTAG/scan busses. All SP-ATTN signals of the host processors 102, 103, 104, and 105 are connected together to an interrupt input signal of the service processor. The service processor 135 has its own local memory 191, and has access to the hardware OP-panel 190.

When data processing system 100 is initially powered up, service processor 135 uses the JTAG/scan I$^2$C busses 134 to interrogate the system (host) processors 102-105, memory controller/cache 108, and RIO Hub 110. At completion of this step, service processor 135 has an inventory and topology understanding of data processing system 100. Service processor 135 also executes Built-In-Self-Tests (BISTs), Basic Assurance Tests (BATs), and memory tests on all elements found by interrogating the host processors 102-105, memory controller/cache 108, and RIO Hub 110. Any error information for failures detected during the BISTs, BATs, and memory tests are gathered and reported by service processor 135.

If a meaningful/valid configuration of system resources is still possible after taking out the elements found to be faulty during the BISTs, BATs, and memory tests, then data processing system 100 is allowed to proceed to load executable code into local (host) memories 160-163. Service processor 135 then releases the host processors 102-105 for execution of the code loaded into host memory 160-163. While the host processors 102-105 are executing code from respective operating systems within the data processing system 100, service processor 135 enters a mode of monitoring and reporting errors. The type of items monitored by service processor 135 include, for example, the cooling fan speed and operation, thermal sensors, power supply regulators, and recoverable and non-recoverable errors reported by processors 102-105, local memories 160-163, and RIO Hub 110. Service processor 135 is responsible for saving and reporting error information related to all the monitored items in data processing system 100.

Data processing system 100 is powered by bulk power controller (BPC) 190, which provides power to various components in the data processing system, such as, for example, processors and I/O enclosures. For instance, bulk power controller 190 distributes power to CEC 101, service processor 135, and RIO enclosure 150 using I$^2$C paths. Each I$^2$C path is primarily used for power control.

Data processing system 100 may be implemented using various commercially available computer systems. For example, data processing system 100 may be implemented using an IBM eServer pSeries Regatta 690 system or an IBM eServer pSeries Squadron system, both products available from International Business Machines Corporation.

Those of ordinary skill in the art will appreciate that the hardware depicted in FIG. 1 may vary. For example, other peripheral devices, such as optical disk drives and the like, also may be used in addition to or in place of the hardware depicted. The depicted example is not meant to imply architectural limitations with respect to the present invention.

As mentioned previously, a service processor or partition may perform diagnostic tests in order to detect failures on the I/O drawers. When an error is detected, a service processor, service partition, or service console is used to read the chip registers on the I/O drawer. This register information is analyzed to determine the FRU callout necessary to clear the error. The mechanism of the present invention for enhancing these FRU callouts by providing an alternative path to the I/O drawers. This alternative path provides systems using RIO links with another means of accessing the chip registers in the I/O drawer. If the I/O drawer contains chip registers that cannot be accessed using the RIO links, the alternative path allows the system to access these chip registers, diagnose the detected failure, and thus provide a more complete FRU callout to correct the error.

When a failure is detected on the I/O drawer, a data processing system uses the bulk power controller to provide the alternate path to the I/O drawers. The path provided by the bulk power controller interface allows the system to read all of the chip registers on the I/O drawers, including the JTAG-accessible registers. The system utilizes a service processor, service partition, or service console to login to the bulk power controller. The system may then use the alternative path provided by the bulk power controller to access the I/O drawers. Commands are sent through the alternative path to obtain debug information from all of the chip registers on the drawers. This debug information is then analyzed and field replacement units are identified to repair the I/O failure. In this manner, more accurate debug information may be obtained to determine the exact location of the failure on the drawer, thus allowing for a more accurate FRU callout.

Figure 2:
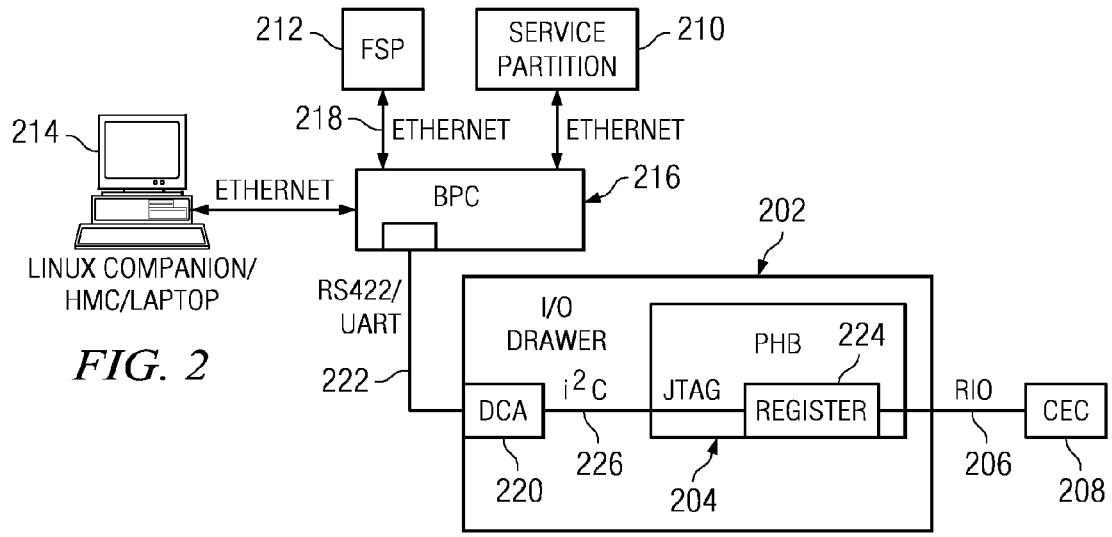
FIG. 2 is a block diagram of a system that provides an alternative path for accessing remote I/O drawers in accordance with a preferred embodiment of the present invention.

With reference now to FIG. 2, a block diagram of a system that provides an alternative path for accessing remote I/O drawers is depicted in accordance with a preferred embodiment of the present invention. The components in FIG. 2 may be implemented in data processing system 100 in FIG. 1.

System 200 includes one I/O drawer 202. I/O drawer 202 contains one PCI host bridge (PHB) 204. However, although depicted with one I/O drawer 202 and one PHB 204, one skilled in the art will recognize that more I/O drawers and PHBs may be included than depicted in FIG. 2. Each PHB may support, for example, between 4 and 8 PCI expansion slots, which may be implemented, for example, as I/O adapter 136 in FIG. 1.

As discussed above, a system may employ service processors or service partitions to execute diagnostic tests. In existing systems, RIO link 206 may be used to connect central electronics complex (CEC) 208 to I/O drawer 202. As CEC 208 comprises one or more system processors and memory, these RIO links provide the communication path from the processors in the CEC to the I/O drawers.

However, as illustrated in FIG. 2, system 200 may also use a communications path provided by the bulk power controller to read chip registers on the I/O drawer. These chip registers may not otherwise be accessible using just the RIO links. In the illustrative example, various components, such as service partition 210, flexible service processor (FSP) 212, and service console 214, are allowed to read chip registers on the drawer. As shown, service console 214 may comprise, for example, a Linux companion system, a Hardware Management Console (HMC), or a laptop, each of which enable a system administrator to monitor system 200 for hardware problems, although other systems may be used to implement the features of the present invention.

Service partition 210, FSP 212, and service console 214 may access the chip registers on the I/O drawer via bulk power controller 216. A connection interface, such as ethernet interface 218 or System Power Control Network (SPCN) interface 220, may be used to connect service partition 210, FSP 212, and service console 214 to bulk power controller 216. System 200 uses service partition 210, FSP 212, and service console 214 to login to bulk power controller 216. As bulk power controller 216 is connected to I/O drawer 202, service partition 210, FSP 212, and service console 214 may then send commands to I/O drawer 202.

Commands are sent to distributed converter assembly (DCA) 220 within I/O drawer 202 using RS422/UART connection 222, which connects bulk power controller 216 to DCA 220. RS422 is an Electronic Industries Alliance specification that deals with data communication. DCA 220 is plugged directly into I/O drawer 202 and receives power from bulk power controller 216. DCA 220 converts the power and supplies precise voltages required by the logic and memory circuitry of the I/O drawer. Within I/O drawer 202, DCA 220 includes an $I^2C$ path to the chip registers on the drawer. For example, register 224 is accessible to service partition 210, FSP 212, and service console 214 using $I^2C$ connection 226.

Debug information for the drawers may then be obtained through the alternative path. System 200 then analyzes the debug information and identifies an appropriate field replacement unit. This field replacement unit is then used to fix the failure. The failed unit is removed and replaced while redundant hardware maintains server operation. A check may be performed to determine that the failure has been removed and that no new problems have resulted from the repair. As the alternative path allows system 200 access to all of the chips on the drawer, more accurate debug information may be obtained to determine the exact location of the failure on the drawer, thus allowing for a more accurate FRU callout.

Figure 3:
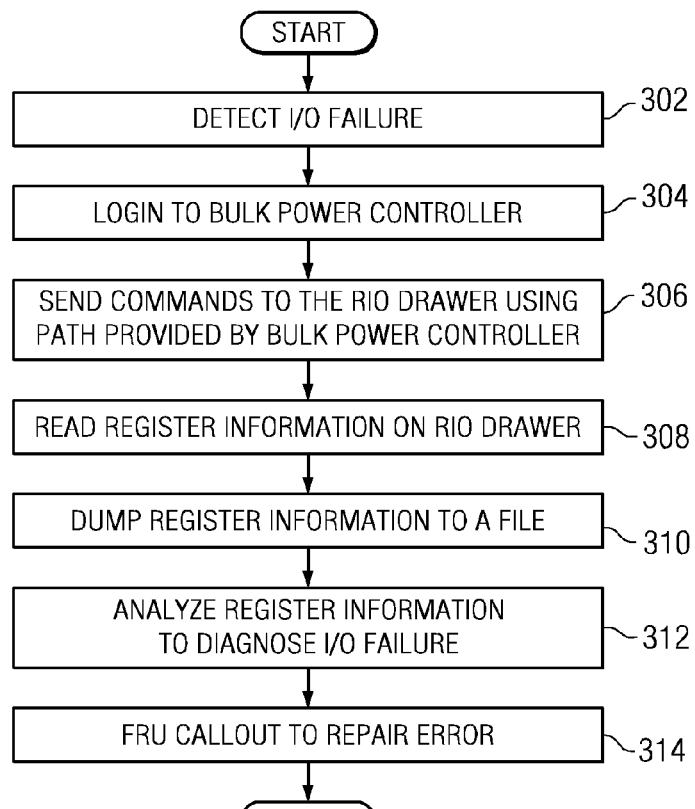
FIG. 3 is a flowchart of a process for self-diagnosing remote I/O enclosures with enhanced FRU callouts in accordance with a preferred embodiment of the present invention.

FIG. 3 is a flowchart of a process for self-diagnosing remote I/O enclosures with enhanced FRU callouts in accordance with a preferred embodiment of the present invention. The process described in FIG. 3 may be implemented in a data processing system, such as data processing system 100 shown in FIG. 1.

The process begins with detecting an I/O failure in a system (step 302). The system may use a service processor, service partition, and/or service console to perform debug test and detect failures in the I/O devices. When an I/O failure is detected, the same service partition, processor, or console that detected the I/O failure or, alternatively, another service partition, processor, or console may be used to login to the bulk power controller (step 304). Once the system is logged into the bulk power controller, the system may use the alternative path provided by the bulk power controller to send commands to the remote I/O drawer (step 306), without having to use the path provided by the RIO cables. In this manner, the I/O drawers may be accessed even if the system is in a checkstop state and the RIO link is broken.

The system may now read the register information on the I/O drawer using the alternative path (step 308). This register information is then dumped, for example, to a file on the service partition (step 310). The system then analyzes the register information to diagnose the I/O failure (step 312). Based on the register information, a FRU callout is then made to repair the failure (step 314). By using the alternative path in this manner, the partition may diagnose the I/O failure with greater granularity and create a log specifying which part should be replaced.

Thus, the present invention provides an alternative path to access chip registers in remote I/O drawers. In systems that only use RIO paths to diagnose problems on the I/O registers, these systems may not be able to read all of the required registers to make a complete diagnosis of a failure on the I/O drawer. These systems do not have JTAG access to remote drawers. In contrast, the mechanism of the present invention allows for enhancing FRU callouts by providing the system the capability of a self-diagnosing I/O enclosure. Using the alternate path provided by the bulk power controller, the system itself is able to read the chip registers on the I/O drawer using a service partition or the service processor. The present invention provides an advantage of allowing a system to access all of the JTAG-accessible registers on the chip, even if the system is in a checkstop state and the RIO link is broken. The system may then use this information to make a self-diagnosis and FRU callout of the problem. In this manner, a more accurate FRU callout may be made based on the register information obtained.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method in a data processing system for self-diagnosing remote input/output enclosures, comprising:
    responsive to detecting an input/output failure in a remote input/output drawer, logging onto a bulk power controller, wherein the bulk power controller provides a communications path between the data processing system and the remote input/output drawer, and wherein the communications path allows the data processing system to read all chip registers on the remote input/output drawer to determine the exact location of the input/output failure on the remote input/output drawer;
    analyzing register information in the remote input/output drawer obtained through the bulk power controller to diagnose the input/output failure; and
    identifying a field replacement unit to repair the input/output failure based on the register information.

2. The method of claim 1, wherein determining the exact location of the input/output failure allows for an accurate field replacement unit callout.

3. The method of claim 1, wherein the chip registers include JTAG-accessible registers.

4. The method of claim 1, wherein the communications path allows the data processing system to read the registers when the data processing system is in a checkstop state and a remote input/output link is broken.

5. The method of claim 1, wherein the communications path includes an I²C link.

6. The method of claim 1, wherein the data processing system uses one of a service partition, service processor, or service console to send a command to read the registers on the remote input/output drawer.

7. The method of claim 6, wherein the service console comprises one of a Linux companion system, a Hardware Management Console, or a laptop.

8. A data processing system for self diagnosing remote input/output enclosures, comprising:
    logging means for logging onto a bulk power controller in response to detecting an input/output failure in a remote input/output drawer, wherein the bulk power controller provides a communications path between the data processing system and the remote input/output drawer, and wherein the communications path allows the data processing system to read all chip registers on the remote input/output drawer to determine the exact location of the input/output failure on the remote input/output drawer;
    analyzing means for analyzing register information in the remote input/output drawer obtained through the bulk power controller to diagnose the input/output failure; and
    identifying means for identifying a field replacement unit to repair the input/output failure based on the register information.

9. The data processing system of claim 8, wherein determining the exact location of the input/output failure allows for an accurate field replacement unit callout.

10. The data processing system of claim 8, wherein the chip registers include JTAG-accessible registers.

11. The data processing system of claim 8, wherein the communications path allows the data processing system to read the registers when the data processing system is in a checkstop state and a remote input/output link is broken.

12. The data processing system of claim 8, wherein the communications path includes an I²C link.

13. The data processing system of claim 8, wherein the data processing system uses one of a service partition, service processor, or service console to send a command to read the registers on the remote input/output drawer.

14. The data processing system of claim 13, wherein the service console comprises one of a Linux companion system, a Hardware Management Console, or a laptop.

15. A computer program product encoded in computer readable storage medium for self-diagnosing remote input/output enclosures, comprising:
    first instructions for logging onto a bulk power controller in response to detecting an input/output failure in a remote input/output drawer, wherein the bulk power controller provides a communications path between the data processing system and the remote input/output drawer, and wherein the communications path allows the data processing system to read all chip registers on the remote input/output drawer to determine the exact location of the input/output failure on the remote input/output drawer;
    second instructions for analyzing register information in the remote input/output drawer obtained through the bulk power controller to diagnose the input/output failure; and
    third instructions for identifying a field replacement unit to repair the input/output failure based on the register information.

16. The computer program product of claim 15, wherein determining the exact location of the input/output failure allows for an accurate field replacement unit callout.

17. The computer program product of claim 15, wherein the chip registers include JTAG-accessible registers.

18. The computer program product of claim 15, wherein the communications path allows the data processing system to read the registers when the data processing system is in a checkstop state and a remote input/output link is broken.

19. The computer program product of claim 15, wherein the communications path includes an I²C link.

20. The computer program product of claim 15, wherein the data processing system uses one of a service partition, service processor, or service console to send a command to read the registers on the remote input/output drawer.

21. The computer program product of claim 20, wherein the service console comprises one of a Linux companion system, a Hardware Management Console, or a laptop.

22. A data processing system for self-diagnosing remote input/output enclosures, comprising:
   a remote input/output drawer;
   a bulk power controller, wherein the bulk power controller provides a communications path between the data processing system and the remote input/output drawer, and wherein the communications path allows the data processing system to read all chip registers on the remote input/output drawer; and
   a service processor, wherein the service processor logs onto the bulk power controller in response to detecting an input/output failure in the remote input/output drawer, and wherein the service processor analyzes register information in the remote input/output drawer obtained through the bulk power controller to diagnose the input/output failure, and wherein the service processor identifies a field replacement unit to repair the input/output failure based on the register information.

23. The data processing system of claim 22, wherein the communications path allows the data processing system to read all chip registers on the remote input/output drawer to determine the exact location of the input/output failure on the remote input/output drawer.

24. The data processing system of claim 22, wherein determining the exact location of the input/output failure allows for an accurate field replacement unit callout.

* * * * *